US007844063B2

(12) United States Patent
Hamacher et al.

(10) Patent No.: US 7,844,063 B2
(45) Date of Patent: Nov. 30, 2010

(54) HEARING AND APPARATUS WITH COMPENSATION OF ACOUSTIC AND ELECTROMAGNETIC FEEDBACK SIGNALS

(75) Inventors: Volkmar Hamacher, Neunkirchen am Brand (DE); Henning Puder, Erlangen (DE)

(73) Assignee: Siemens Audiologische Technik GmbH, Erlangen (DE)

( * ) Notice: Subject to any disclaimer, the term of this patent is extended or adjusted under 35 U.S.C. 154(b) by 1254 days.

(21) Appl. No.: 11/410,629

(22) Filed: Apr. 25, 2006

(65) Prior Publication Data

US 2006/0239484 A1 Oct. 26, 2006

(30) Foreign Application Priority Data

Apr. 25, 2005 (DE) ...................... 10 2005 019 149

(51) Int. Cl.
*H04R 25/00* (2006.01)
*H04R 27/00* (2006.01)
*H04R 3/00* (2006.01)
*H04B 15/00* (2006.01)

(52) U.S. Cl. ...................... 381/318; 381/312; 381/317; 381/83; 381/93; 381/96

(58) Field of Classification Search ................ 381/317, 381/318, 331
See application file for complete search history.

(56) References Cited

U.S. PATENT DOCUMENTS

| | | | | |
|---|---|---|---|---|
| 5,091,952 | A * | 2/1992 | Williamson et al. | 381/318 |
| 5,710,820 | A * | 1/1998 | Martin et al. | 381/321 |
| 6,038,262 | A * | 3/2000 | Ganter | 375/296 |
| 6,072,884 | A * | 6/2000 | Kates | 381/318 |
| 6,097,823 | A * | 8/2000 | Kuo | 381/312 |
| 6,950,528 | B2 | 9/2005 | Fischer | |
| 7,181,033 | B2 * | 2/2007 | Fischer et al. | 381/317 |
| 7,203,328 | B2 * | 4/2007 | Beimel et al. | 381/318 |
| 2003/0072465 | A1 | 4/2003 | Fischer et al. | |
| 2004/0136557 | A1 * | 7/2004 | Kaulberg | 381/318 |

FOREIGN PATENT DOCUMENTS

| | | | |
|---|---|---|---|
| DE | 103 13 330 | A1 | 10/2004 |
| EP | 1119218 | A1 | 7/2001 |
| EP | 1 307 072 | A2 | 5/2003 |
| EP | 1 367 856 | A2 | 12/2003 |
| EP | 1406469 | A2 | 4/2004 |

* cited by examiner

*Primary Examiner*—Brian Ensey
*Assistant Examiner*—Sunita Joshi

(57) ABSTRACT

Hearing aids with microphone and telephone coil are to be made simpler and more convenient. For this purpose it is provided to use an adaptive filter to compensate acoustic and electromagnetic feedback. In order to allow for the propagation delay differences, a delay element is connected downstream of the telephone coil. The microphone and telephone coil signals can be individually weighted with the factors a and b so that mixed mode is also possible.

10 Claims, 1 Drawing Sheet

HEARING AND APPARATUS WITH COMPENSATION OF ACOUSTIC AND ELECTROMAGNETIC FEEDBACK SIGNALS

CROSS REFERENCE TO RELATED APPLICATIONS

This application claims priority of German application No. 102005019149.5 filed Apr. 25, 2005, which is incorporated by reference herein in its entirety.

FIELD OF THE INVENTION

The invention relates to a hearing aid apparatus, particularly to a hearing aid apparatus with compensation of acoustic and electromagnetic feedback signals.

BACKGROUND OF THE INVENTION

DE 103 13 330 A1 discloses the weighted combination of two microphone signals MS1 and MS2 from microphones M1 and M2, thereby enabling the effect of an acoustic interference signal on the reception of a directional microphone system to be suppressed on a direction-dependent basis.

EP 1 307 072 A2 discloses a hearing aid with three microphones wherein a delay element is connected to one of the microphones. This arrangement is designed to prevent interfering acoustic effects during turn-on, turn-off or switching processes.

Publication EP 1 367 856 A2, however, also discloses an apparatus and a method for electrical feedback reduction in hearing systems. For this purpose an amplifier apparatus is proposed which, in addition to an amplifier device having an acoustic and an inductive input, has two separate compensation paths. In the first compensation path, a first filter device acts to compensate acoustic feedback and in the second compensation path a second filter device acts to compensate inductive feedback. In this way the two very different feedbacks can be individually compensated without using a complex common filter.

SUMMARY OF THE INVENTION

The object of the present invention is to improve, in terms of listening convenience, or simplify a hearing aid apparatus comprising a microphone and an electromagnetic receiver as input transducers.

This object is achieved according to the invention by a hearing aid apparatus comprising a microphone and an electromagnetic receiver as input signal transducers, an earpiece as output signal transducer, there being produced acoustic feedback to the microphone and electromagnetic feedback to the electromagnetic receiver or a following electrical component, a signal processing device connected between the input transducers and the output transducer, and an adaptive compensation device, which is connected to the signal processing device and has a single adaptive filter, for compensating the acoustic feedback, the compensation device being used simultaneously for compensating the electromagnetic feedback and a delay element being connected between the electromagnetic receiver and the signal processing device, thereby ensuring that both the acoustic feedback and the electromagnetic feedback is compensated by a single adaptive filter.

There is additionally provided according to the invention a hearing aid apparatus comprising a microphone, an electromagnetic receiver and a signal processing device for processing the signals of the microphone and/or of the electromagnetic receiver as well as a weighting device with which the signal of the microphone and/or of the electromagnetic receiver can be individually weighted prior to processing by the signal processing device so that both signals are audible through the hearing aid apparatus in the appropriate weighting ratio. This means that the hearing aid can be used in purely microphone mode, in purely telephone coil mode and in mixed mode.

For the hearing aid apparatus with the common adaptive filter for compensating the acoustic and electromagnetic feedback, a weighting device is also preferably connected between the input transducers and the signal processing device so that the signals of the input transducers can be individually weighted. This enables compensation to be always achieved in all operating modes (microphone mode, coil mode or mixed mode) using simple means.

In a particular embodiment an adder device can be connected upstream of the signal processing device in order to add the weighted signals. This means that the weighted input signals of the input signal transducers are combined prior to further signal processing.

In another particular embodiment the compensation device can incorporate a timing element whose delay corresponds to the propagation time of the acoustic feedback signal, the delay introduced by the delay element between the electromagnetic receiver and the signal processing device corresponding to the propagation time difference of the acoustic and electromagnetic feedback signal, thereby enabling the length of the adaptive filter to be kept short for digital signal processing.

BRIEF DESCRIPTION OF THE DRAWINGS

The present invention will now be explained in greater detail with reference to the accompanying drawings in which.

DETAILED DESCRIPTION OF THE INVENTION

The present invention relates to a hearing aid apparatus comprising a microphone and an electromagnetic receiver as input signal transducers, an earpiece as output signal transducer, there being produced acoustic feedback to the microphone and electromagnetic feedback to the electromagnetic receiver or a following electrical component, a signal processing device connected between the input transducers and the output transducer, and an adaptive compensation device, which is connected to the signal processing device and has a single adaptive filter, for compensating the acoustic feedback.

In addition to acoustic feedback signals which are overcoupled from the hearing aid output to the microphones and may thus result in feedback whistle, in the case of hearing aids with telephone coils there is additionally the risk, during telephone coil operation, of electrical or more precisely electromagnetic feedback between the hearing aid earpiece and the telephone coil, which may likewise result in feedback whistle. These problems have hitherto been solved mainly by skillful placement and shielding of the components concerned, in particular the hearing aid earpiece.

The examples described below represent preferred embodiments of the present invention.

Figure 1:
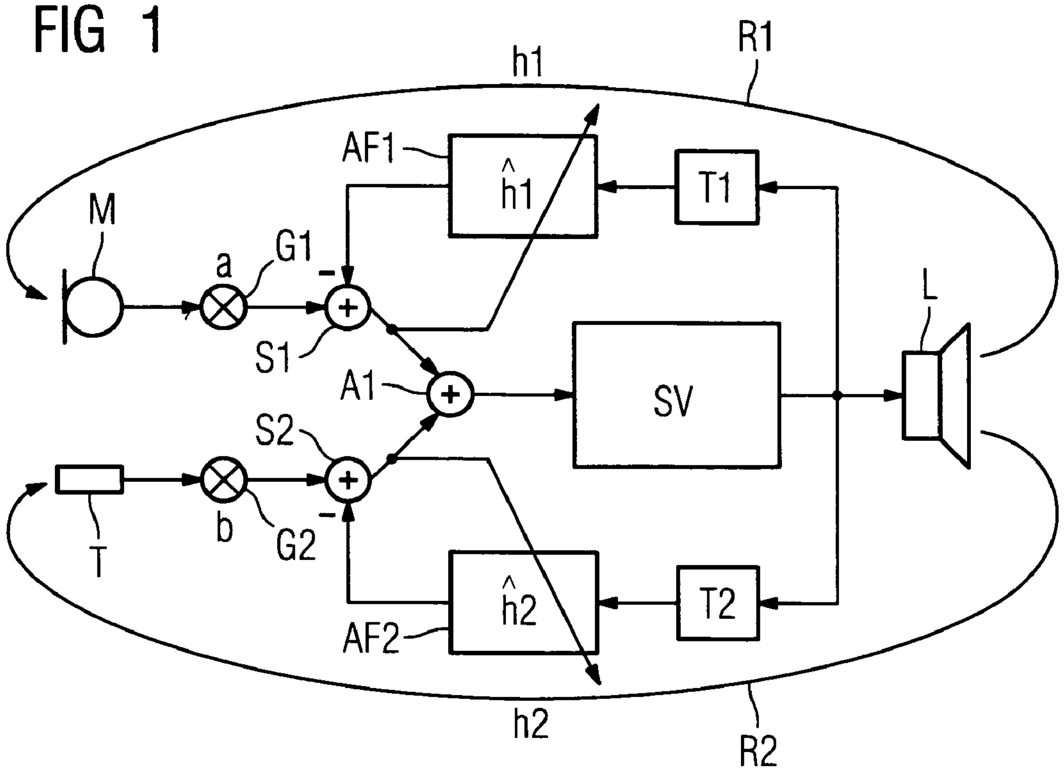
FIG. 1 shows a block diagram of a hearing aid with weightable input signals and two compensation paths and FIG. 2 shows a block diagram of a hearing aid with two weightable input signals and a single compensation path.

In the first exemplary embodiment according to FIG. 1 the signal of a loudspeaker L of the hearing aid is fed back via an acoustic feedback path R1 with the corresponding transfer function hi to the microphone M of the hearing aid. Similarly, an electromagnetic signal of the loudspeaker L is fed back via an electromagnetic feedback path R2, which possesses the corresponding transfer function h2, to a telephone coil T. The input signal transducers M and T produce corresponding output signals. The output signal of the microphone M is weighted in a weighting unit G1 with the weighting factor a, whereas the output signal of the telephone coil T is weighted in a weighting unit G2 with the weighting factor b.

To compensate the acoustic feedback signal, the input signal of the loudspeaker L is fed via a first timing element T1 to an adaptive filter AF1 with the variable transfer function h1. The output signal of the adaptive filter AF1 is subtracted in a first subtractor S1 from the weighted microphone signal. The output signal of the subtractor S1 is used, among other things, for adapting the filter AF1.

Analogously to the acoustic compensation path T1, AF1 there is provided an electromagnetic compensation path T2, AF2 with the second timing element T2 and the adaptive filter AF2 whose transfer function is h2. The output signal of the adaptive filter AF2 is subtracted from the weighted signal of the telephone coil T using a second subtractor S2. Here too, the output signal of the subtractor S2 is used for adapting the second adaptive filter AF2.

The output signals of the subtractors S1 and S2 are added together in an adder A1 and the summation signal is fed to a signal processor SV. The output signal of the signal processor feeds the loudspeaker L.

The electrical feedback between earpiece or loudspeaker L and microphone coil or telephone coil T is therefore compensated in the same way as the acoustic feedback by modeling the transmission path between loudspeaker L and telephone coil T by an adaptive filter AF2 and subtracting the earpiece signal weighted with this filter AF2 from the coil output.

The signals of the input transducers can be weighted with the factors a and b, thereby enabling the relationship between the signals picked up to be influenced. If, for example, a=1, b=0 is set, purely microphone mode is present. If, on the other hand, a=0, b=1 is set, coil mode is present. If the factors a and b are selected otherwise, mixed mode is desired whereby both the signal of the microphone and that of the telephone coil are processed in the signal processor SV and presented via the loudspeaker L.

"Switching" between microphone and coil mode can be effected subject to control via a (telephone) classifier. This detects whether wanted signals—in most cases speech—are present at the microphone M and/or at the telephone coil T and then automatically switches seamlessly if required to the relevant mode provided, e.g. purely microphone mode, purely coil mode or mixed mode.

Figure 2:
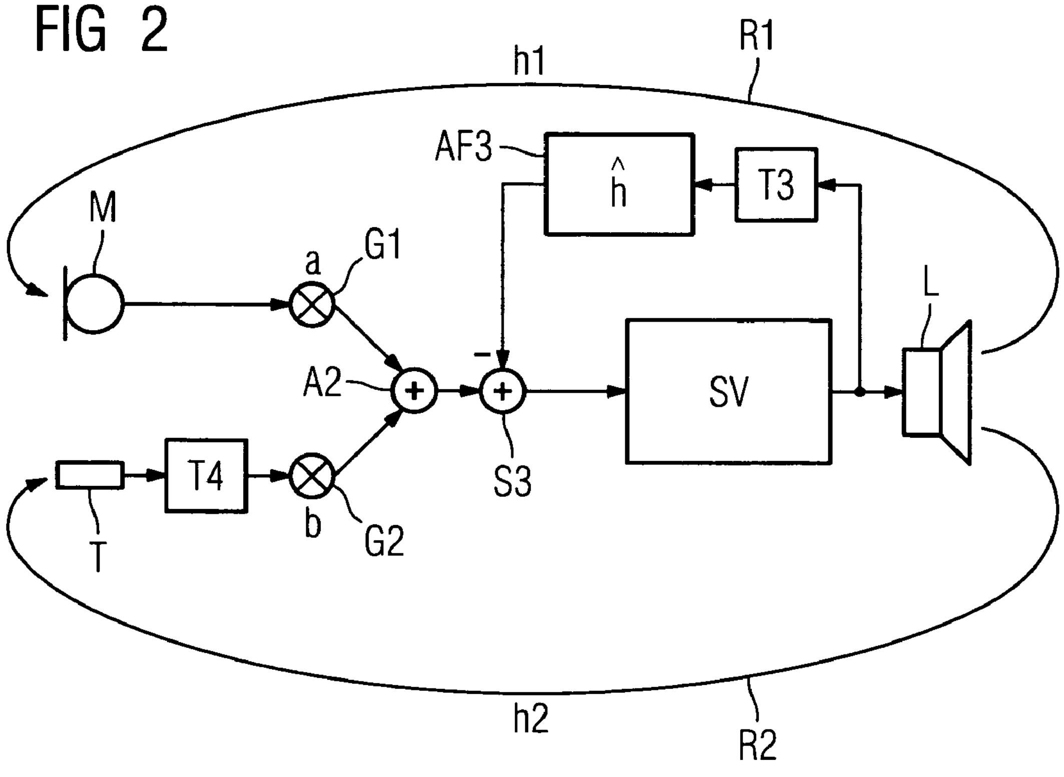

A second embodiment of the present invention is schematically illustrated in FIG. 2. The basic design of the hearing aid comprising loudspeaker L, microphone M, telephone coil T and signal processor SV corresponds to that of the exemplary embodiment in FIG. 1. Consequently there also exist the acoustic feedback path R1 with the transfer function h1 and the electromagnetic feedback path R2 with the transfer function h2.

The output signals from microphone M and telephone coil T are once again weighted by the factors a and b using the weighting units G1 and G2. Between the telephone coil T and the assigned weighting unit G2 there is here additionally provided a timing element T4 in order to allow for the slower acoustic feedback. After weighting in the weighting units G1 and G2 the two signals are added together in an adder A2.

The input signal of the loudspeaker L is fed back via a compensation path which has a timing element T3 and via an adaptive filter AF3. The adaptive filter AF3 possesses the transfer function h. The output signal of the adaptive filter AF3 is subtracted in a subtractor S3 from the output signal of the adder A2. The output signal of the subtractor S3 is fed to the signal processor SV whose output signal feeds the loudspeaker L.

The acoustic and electromagnetic feedback signals are therefore compensated here by the common adaptive filter AF3. For purely microphone mode (a=1, b=0) or purely coil mode (a=0, b=1), the filter AF3 undertakes either adaptation to the feedback R1 with the transfer function h1 or to the feedback R2 with the transfer function h2. Therefore the timing element T3 should either be set to the value of the timing element T1 or to that of the timing element T2 from the example in FIG. 1, the time delay in the timing element T4 remaining 0.

Of particular interest, however, is mixed mode (a, b random). Here the adaptive filter AF3 can simultaneously undertake adaptation to both signal paths. For this purpose, the value of the timing element T3 must be set to that of the timing element T1 (T3=T1). In addition, T4=T1−T2 must be set so that the coil signal is delayed by the greater acoustic propagation time (T1>T2).

For digital signal processing and a sampling rate of 20 kHz, T4 must be no more than about 15 samples so that this delay is imperceptible. Alternatively, if the delay T4 is to be avoided, T4=0 and T3=T2 can be set, although then, in the worst case scenario, the length of the adaptive filter AF3 must be increased by up to T1−T2 filter values. This increased length is due to the fact that the two feedback signals with the different propagation times must be compensated by the adaptive filter.

The invention claimed is:

1. A hearing aid apparatus designed for compensating acoustic feedback from an earpiece to a microphone and electromagnetic feedback from the earpiece to an electromagnetic receiver or a following electrical component, the apparatus comprising:

a microphone adapted for use as a first input signal transducer;

an electromagnetic receiver adapted for use as a second input signal transducer;

an earpiece adapted for use as an output signal transducer from which an acoustic output signal is fed back to the microphone via an acoustic feedback path and an electromagnetic output signal is fed back to the electromagnetic receiver via an electromagnetic feedback path;

a signal processing device connected between the first and second input signal transducers and the output signal transducer;

a first weighting unit configured to adjust a signal from the microphone in accord with a first selectable weighting factor, the first weighting unit positioned between the microphone and the signal processing device;

a second weighting unit configured to adjust a signal from the electromagnetic receiver in accord with a second selectable weighting factor, the second weighting unit positioned between the electromagnetic receiver and the signal processing device;

a first adder positioned to add the signal from the microphone to the signal from the electromagnetic receiver after each signal has been adjusted in accord with a selected weighting factor;

a first timing element positioned between one of the input signal transducers and the first adder to adjust one of the signals received by the adder relative to an acoustic feedback delay characteristic;

a second adder positioned between the first adder and the signal processing device to adjust an output from the first adder with a compensation signal; and a single adaptive filter connected to the second adder to generate, as the compensation signal, a signal for simultaneously compensating the acoustic feedback and the electromagnetic feedback; and a second timing element positioned between the earpiece and the single adaptive filter to introduce a delay to the compensation signal, which delay corresponds to a propagation time of the acoustic feedback signal, wherein the first timing element adjusts one of the signals received by the adder by introducing a delay which corresponds to a propagation time difference between the acoustic and electromagnetic feedback signals.

2. The hearing aid apparatus as claimed in claim 1, wherein the first timing element is positioned between the electromagnetic receiver and the first adder to adjust the signal from the electromagnetic receiver.

3. The hearing aid apparatus as claimed in claim 1, wherein a microphone mode is selected by adjusting the second selectable weighting factor to provide for only the signal of the microphone to be processed in the signal processing device.

4. The hearing aid apparatus as claimed in claim 1, wherein an electromagnetic mode is selected by adjusting the first selectable weighting factor to provide only the signal of the electromagnetic receiver to be processed in the signal processing device.

5. The hearing aid apparatus of claim 1, wherein a classifier is operatively positioned to detect presence of a speech signal in the signal from the microphone and the signal from the electromagnetic transducer, and to automatically switch between modes of providing only a signal from the microphone, only a signal from the electromagnetic transducer or signals from both the microphone and the electromagnetic transducer in accord with selected weighting factors.

6. The hearing aid apparatus as claimed in claim 1, wherein a pure microphone mode, a pure electromagnetic mode or a mixed mode are selectable based on selection of the first or second weighting factor wherein the pure microphone mode minimizes transmission of the signal from the electromagnetic receiver to the signal processing device, the pure electromagnetic mode minimizes transmission of the signal from the microphone to the signal processing device, and the mixed mode provides a selectable mixture of signals from the microphone and the electromagnetic receiver.

7. A hearing aid apparatus, comprising:

a microphone;

an electromagnetic receiver;

an earpiece adapted for use as an output signal transducer from which an acoustic output signal is fed back to the microphone via an acoustic feedback path and an electromagnetic output signal is fed back to the electromagnetic receiver via an electromagnetic feedback path;

a signal processing device operatively connected between each of the microphone and the electromagnetic receiver and the earpiece;

a first weighting unit configured to adjust a signal from the microphone in accord with a first selectable weighting factor, the first weighting unit positioned between the microphone and the signal processing device;

a second weighting unit configured to adjust a signal from the electromagnetic receiver in accord with a second selectable weighting factor, the second weighting unit positioned between the electromagnetic receiver and the signal processing device;

a first adder positioned between the first weighting unit and the signal processing device to receive and further adjust the signal from the microphone with a first compensation signal and to provide a first adder output signal;

a first adaptive filter connected to the first adder to generate, as the first compensation signal, a signal for compensating the acoustic feedback;

a second adder positioned between the second weighting unit and the signal processing device to receive and further adjust the signal from the electromagnetic receiver with a second compensation signal and to provide a second adder output signal;;

a second adaptive filter connected to the second adder to generate, as the second compensation signal, a signal for compensating the electromagnetic feedback; and a third adder positioned between each of the first and second adders and the signal processing device to combine the first and second adder output signals.

8. The hearing aid apparatus as claimed in claim 7, wherein a microphone mode is selected by adjusting the second weighting factor, the selection providing for only the signal of the microphone to be processed in the signal processing device.

9. The hearing aid apparatus as claimed in claim 7, wherein an electromagnetic mode is selected by adjusting the first weighting factor, the selection providing for only the signal of the electromagnetic receiver to be processed in the signal processing device.

10. The hearing aid apparatus as claimed in claim 7, wherein a classifier switches between a microphone mode and an electromagnetic mode and a mixed signal mode wherein the mode is determined by adjustment of one or both of the weighting factors.

* * * * *